United States Patent [19]

Mallory et al.

[11] Patent Number: 4,681,706

[45] Date of Patent: Jul. 21, 1987

[54] NUCLEAR WASTE PACKAGING FACILITY

[75] Inventors: Charles W. Mallory, Severna Park, Md.; Ralph E. Watts, Library; Joseph B. Paladino, Pittsburgh, both of Pa.; John E. Razor, Morehead, Ky.; Arthur W. Lilley, Finleyville; Steven J. Winston, New Stanton, both of Pa.; Billy C. Stricklin, Oak Ridge, Tenn.

[73] Assignee: Westinghouse Electric Corp., Pittsburgh, Pa.

[21] Appl. No.: 627,964

[22] Filed: Jul. 5, 1984

[51] Int. Cl.[4] .......................... G21F 7/06; B25J 21/00; B65B 3/04; B65B 63/02

[52] U.S. Cl. .................................... 252/633; 252/628; 576/272; 576/261; 53/529; 53/282; 422/159; 250/506.1

[58] Field of Search ................ 252/633, 628; 376/272, 376/261; 53/529, 382; 422/159

[56] References Cited

U.S. PATENT DOCUMENTS

| | | | |
|---|---|---|---|
| 3,325,008 | 6/1967 | Lancy . | |
| 3,663,817 | 5/1972 | Sayers | 422/159 |
| 3,835,652 | 9/1974 | Highnite . | |
| 3,847,808 | 11/1974 | Spohr . | |
| 3,935,467 | 1/1976 | Gablin . | |
| 3,940,628 | 2/1976 | Stock et al. . | |
| 4,008,658 | 2/1977 | Stock et al. . | |
| 4,166,709 | 9/1979 | Valiga . | |
| 4,175,669 | 11/1979 | Housholder . | |
| 4,177,386 | 12/1979 | Wachter et al. . | |
| 4,192,629 | 3/1980 | Hallenium . | |
| 4,196,169 | 4/1980 | Gablin et al. . | |
| 4,229,316 | 10/1980 | Baatz et al. . | |
| 4,234,448 | 11/1980 | Hirano et al. . | |
| 4,276,164 | 6/1980 | Martone et al. . | |
| 4,297,827 | 11/1981 | Allison . | |
| 4,352,601 | 10/1982 | Valiga et al. . | |
| 4,362,434 | 12/1982 | Valiga et al. . | |
| 4,375,930 | 3/1983 | Valiga . | |
| 4,377,509 | 3/1983 | Haynes et al. . | |
| 4,414,475 | 11/1983 | Kratz et al. . | |
| 4,415,459 | 11/1983 | Coffman et al. . | |
| 4,584,821 | 4/1986 | Booth | 53/448 |

OTHER PUBLICATIONS

Article entitled "Le Centre de la Manche", *Agence Nationale pour la Gestion de Dechets Radioactifs*, Commissariat a l'Energie Atomique, 1981.

"GNS", STEAG Kernenergie GmbH, West Germany (undated).

"Savepak Mobile Dry Active Waste Handling, Compaction and Disposal Services", Westinghouse Hittman Nuclear, Inc., Columbia, Md. (undated).

*Primary Examiner*—Frederick R. Schmidt
*Assistant Examiner*—William E. Terrell

[57] ABSTRACT

A nuclear waste packaging facility for receiving both contact and remote handled nuclear waste in portable shipping containers and encapsulating this waste into ground-disposable modules is disclosed herein. The facility generally comprises a separately shielded section for processing remote handled waste including various remotely-controlled winches and conveyors, as well as a second, separately shielded section for processing contact handled waste. A module transportation and loading section is disposed between the remote and contact handled waste sections of the facility, and places empty module containers in a loading position adjacent each of the two, separately shielded sections of the facility. Both the contact and remote handled waste sections include radiation and ultrasonic detectors for determining the radioactive level of the waste, and whether or not any of this waste is in liquid form. The outputs of these detectors are connected to a central computer, which generates a signal indicating how much of the contact or non-contact handled waste may be loaded into a particular module container before the surface radiation of the completed module will exceed a certain, preselected limit. Additionally, the computer actuates an alarm circuit when either of the ultrasonic detectors generates a signal indicating that any of the waste is in liquid form. Finally, a common grouting station having an extendable trough may be used to grout modules loaded from either the contact or remote handled waste sections of the facility. The facility is preferably close to a land burial site to minimize the distance the completed modules must be transported before they are permanently buried.

18 Claims, 10 Drawing Figures

NUCLEAR WASTE PACKAGING FACILITY

CROSS-REFERENCE TO RELATED APPLICATIONS

Cross-reference is made to related applications Ser. Nos. 06/627,977 and 06/627,896 both filed on July 5, 1984, pending, and assigned to the same assignee as the present invention.

BACKGROUND OF THE INVENTION

1. Field of the Invention

This invention generally relates to a facility for receiving nuclear waste of various radiation levels in shipping containers and solidly over-packing this waste into a module having a sufficiently low surface radiation count so that the wastes may be safely handled by human workers and permanently buried at a waste disposal site.

2. Description of the Prior Art

Systems for packaging nuclear waste are known in the prior art. In the earliest of these systems, such wastes were merely packed on site into 55-gallon steel drums. The drums were then transported to a remote burial site. The surface radiation of these drums was often too high to allow them to be handled by human workers; consequently, the drums were handled by long boom cranes, which dropped the drums into simple trenches, where they were buried. Such systems were known as "kick and roll" systems. Unfortunately, such "kick and roll" systems proved to be unsatisfactory for the land disposal of nuclear wastes. The loose soil which these trenches were filled in with was much more permeable to water than the densely-packed soil which formed the trench sides, or the dense rock strata which typically formed the trench bottom. The permeability of the loose soil surrounding the drums caused these trenches to collect large amounts of standing water in what is known as the "bathtub effect". This standing water ultimately caused the steel walls of the drums buried within these trenches to corrode and collapse. The collapsing drums and compaction of the soil over time resulted in a downward movement or subsidence of the soil which caused a depression to form over the top of the trench. This depression in turn collected rain and other forms of surface water and hence worsened the tendency of the trench to collect and maintain a pool of standing water over the drums. The increase in standing water resulted in still more soil subsidence, and accelerated the corrosion and collapse of the drums buried therein. The corrosion and collapse of the drum containers in such sites has resulted in some radioactive contamination of the ground water flowing through them.

To solve the problems associated with such "kick and roll" packaging and disposal systems, packaging systems utilizing radiation-shielding concrete packages were developed. In contrast to the thin walls of the 55-gallon drums, the thick walls of these concrete packages reduced the surface radiation of the resulting package to a point where they did not have to be handled by long-boom cranes. Instead, they could be safely handled by human operators. Additionally, the thick layer of concrete was much more resistant to degradation from ground water. In use, these thick-walled concrete packages were carried to the sites where the waste was generated, which was typically a nuclear power plant. The waste was thrown directly into the interior of these packages, and the packages were sealed on-site at the nuclear plant. The sealed packages were then carried to a remote disposal site and buried. The low surface radiation associated with these concrete packages allowed them to be stacked in an orderly fashion within the burial trench along with wastes in other containers by shielded forklifts.

Unfortunately, despite the superiority of such concrete packaging over the drum-type packaging used in "kick and roll" systems, there are still a number of shortcomings associated with this particular packaging system. First, the packaging of the waste at the nuclear power plant for burial at a remotely-located disposal site required a great expenditure in time and effort in transporting the heavy concrete packages to and from the site. Second, the unisolated processing of the waste at the nuclear power plant exposed the plant to the possibility of nuclear contamination if any mishaps occur during the on-site packaging process. Third, there was no provision in such a system for determining whether or not any of the waste dumped into the concrete package was in liquid form. Federal regulations now strictly prohibit the burying of any waste in liquid form; therefore, the inability to quickly and conveniently confirm that none of the wastes loaded into the package are in liquid form is important. Fourth, this system could not conveniently handle high-level wastes, such as spent control rods; the concrete walls of the packages were simply not thick neough to reduce the surface radiation of the package to an acceptable level. Finally, the surface radiation of the concrete packages varied depending on the activity of the particular wastes packed therein; this system had no provision for conveniently confirming that the surface radiation of the resulting package did not exceed the maximum safe level at which the package could be directly handled by human workers.

Clearly, a need exists for a packaging system which is capable of packaging radioactive waste of contactable and non-contactable levels of radioactivity into modules whose surface radiation does not exceed that which can be safely handled by human operators. Ideally, such a packaging system would cut to a minimum the amount of transportation of heavy packages, and should have some sort of means for preventing the radioactive contamination of the surrounding area should any mishaps occur during the packaging process. Finally, such a system should be capable of determining whether or not any liquids are present in the waste.

SUMMARY OF THE INVENTION

In its broadest sense, the invention is a nuclear waste packaging facility for receiving both contact-handled and remote-handled nuclear waste in shipping containers, and encapsulating the waste into modules. The facility includes a first shielded section for processing remote handled waste by remotely-controlled means, and a second, separately shielded section for processing contact handled waste. The facility further includes a module transporation and loading section disposed between the first and second sections for placing empty module containers in a loading position adjacent to each section. Separation of the facility into two separately shielded sections for processing contact and remote handled waste allows the facility to safely package waste of widely varying radioactivity with a minimum of expensive, remote-controlled handling equipment.

Additionally, the use of a common module transportation and loading section for both the contact and remote handled sections economizes on the amount of machinery needed to encapsulate the various waste into permanent forms for burial.

Both the first and second sections of the facility may each include its own characterization station. Each of these stations may include various radiation and ultrasonic detectors for determining the radioactive level of the waste, and whether or not any of the waste is in liquid form, respectively. Additionally, the outputs of these radiation and ultrasonic etectors may be connected to a computer, which is capable of generating a signal indicative of the number of waste containers which can be loaded into a partiuclar module container before the surface radiation of the completed module will exceed a certain, preselected level. The computer may also be programmed to actuate an alarm signal when the ultrasonic detector indicates that at least some of the waste sought to be encapsulated is in liquid form. Finally, both the contact and remote handled waste sections of the facility may include lag wells for temporarily storing waste arriving in broken containers, in illegal liquid forms, as well as separately shielded remedial action areas where such broken containers may be repaired, and where waste in liquid form may be converted into a buriable, solid form.

The module loading and transportation section of the facility may include first and second parallel rail assemblies adjacent the remote and contact handled waste sections of the facility, respectively. The module loading and transportation section may include rail carts for transporting the module containers into loading positions adjacent the contact and remote handled waste sections, and the rail assemblies may include inclined beds so that the rail carts may roll into these loading positions by the force of gravity. In order to insulate the contact handled waste section of the facility from exposure to dangerous radiation during the process of loading remote handled waste into the modules, a shield wall may be placed along the transportation and loading section of the facility.

Finally, the facility may include a single grouting station with an extendable trough for grouting waste loaded into the module containers from either the contact or remote handled sections of the facility. The use of a common grouting station having an extendable trough complements the overall arrangement of the facility in maximizing the efficiency of the packaging machinery used in the facility. The facility is preferably near a land disposal site in order to minimize the expense of transporting and burying the modules.

BRIEF DESCRIPTION OF THE SEVERAL FIGURES

DETAILED DESCRIPTION OF THE PREFERRED EMBODIMENT

Figure 1:
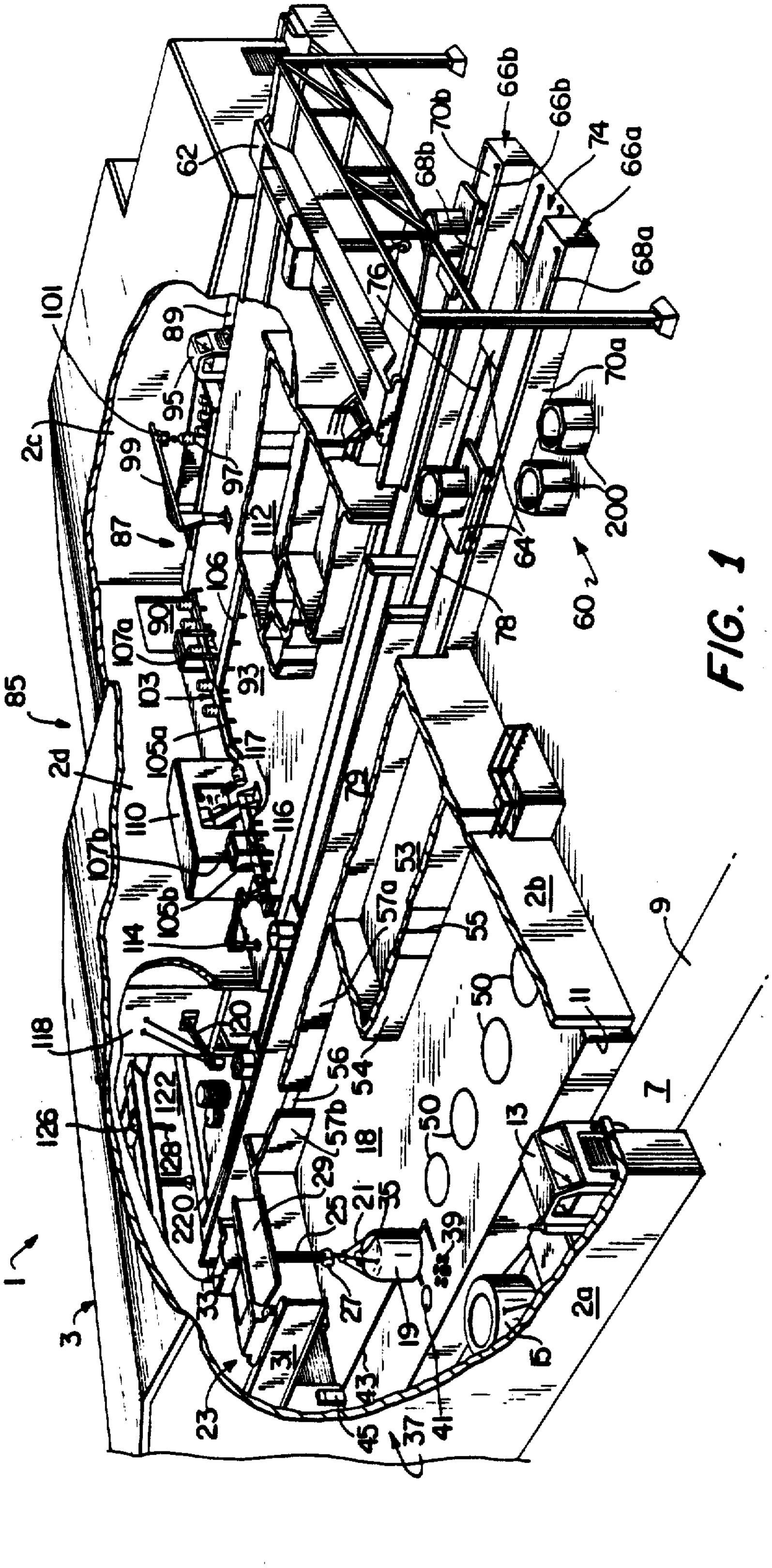
FIG. 1 is a perspective, cutaway view of the packaging facility used in the system of the invention.

With reference now to FIG. 1, wherein like reference numerals designate like components throughout all of the several figures, the packaging facility 1 of the system of the invention generally comprises four isolation walls 2a, 2b, 2c and 2d which enclose a remote handled waste packaging section 3 on the left side of the building, a module loading and transportation section 60 in the center of the building, and a contact handled waste section 85 on the right side of the building. Both the remote and contact handled waste sections 3 and 85 include a drive-through 7 and 87, respectively. At these drive-throughs 7 and 87, trucks 13 and 95 deliver remote and contact handled nuclear waste in relatively lightweight shipping containers (i.e., liners, 55-gallon drums, and LSA containers) from remotely located waste generating sites for encapsulation into the relatively heavy, solidly packed modules 200. In the preferred embodiment, the final disposal site 150 of the modules 200 packed by the packaging facility 1 is located in close proximity to the facility 1 in order to minimize the distance which the packed modules 200 (which may weigh over 30,000 pounds) must be transported. At the outset, it should be noted that there are at least three major advantages associated with a facility surrounded by isolation walls which is remotely located from the waste-generating sites, yet is close to a final disposal site 150. First, there is no need to transport the relatively heavy modules 200 to the waste generating site. Second, the possibility of the waste-generating site from becoming contaminated from a packaging accident is eliminated. Thirdly, the isolation walls 2a, 2b, 2c and 2d minimize the possibility of the disposal site 150 becoming contaminated from any packaging accidents.

Turning now to a more specific description of the remote-handled waste section 3 of the facility 1, this section 3 includes a driveway 9 having an entrance (not shown) and an exit 11 for receiving a delivery truck 13. Such trucks 13 will normally carry their loads of nuclear waste in a reusuable, shielded shipping cask 15 of the type approved by the U.S. Department of Transportation or the U.S. Nuclear Regulatory Commission. Disposed within such shielded shipping casks 15 are metallic or plastic liners (not shown) which actually hold the wastes. Section 3 of the facility 1 further includes a processing platform 18 which is about the same height as the height of the bed of the truck 13, a shield bell 19 having a hook assembly 21, and a remote-controlled traveling crane 23. The shield bell 19 is preferably formed from a steel shell having a lead liner which is thick enough to reduce the amount of radiation emanated from the non-contact waste to an acceptible level. The crane 23 includes a primary hoist 25 detachably connectable to the hook assembly 21 of the shield bell 19 via an electric motor-operated pulley assembly 27. The traveling crane 23 further includes a carriage 29 for moving the primary hoist 25 in the "X" direction (parallel to the driveway 9 of the drive-through 7), as well as a trolley 33 for moving the primary hoist 25 in a "Y" direction (parallel to the front face of the facility 1). The vertically adjustable, electric motor-operated pulley assemby 27, in combination with the carriage 29 and trolley 33, allows the traveling crane 23 to swing the shield bell 19 over the shipping cask 15 of the delivery truck 13, pick up the waste-containing liner out of the cask 15, and place the liner at a desired position onto the processing platform 18. Although a remote-controlled traveling crane 23 operated via a T.V. monitor is used in the preferred embodiment, any number of other types of existing remote-controlled crane mechanisms may be used to implement the invention. In addition to primary hoist 25, a secondary hoist 35 is also connected between the traveling crane 23 and the shield bell 19. The secondary hoist 35 controls the position of a cable and hook (not shown) inside the shield bell 19 which is capable of detachably engaging the waste-containing liner disposed within the shielded shipping cask 15.

The remote-handled waste section 3 of the building 1 further includes a characterization station 37 having various radiation detectors 39 and ultrasonic detectors 41 for verifying that the contents of the liner inside the shippping cask 15 conform to the shipping manifest. The radiation detectors 39 are used to measure the intensity of the radiation emanating from the waste contained in the liner and the check the "signature" of the radiation spectrum of this waste to confirm the accuracy of the shipping manifest. The ultrasonic detectors 41 are used to determine whether or not any radioactive liquids are present within the liner. Federal regulations strickly prohibit the burial of radioactive wastes in liquid form; consequently, the information provided by the ultrasonic detectors 41 is of paramount importance. Both the radiation detectors 39 and ultrasonic detectors 41 are electrically connected to a bank of read-out dials 45 by means of cables disposed in grooves 43 in the processing platform 18. Although not specifically shown in any of the several figures, the outputs of the radiation detectors 39 and the ultrasonic detectors 42 are preferably fed into a central computer both for record-keeping purposes, and for determining how much of a particular kind of waste can be loaded into a particular module before the surface radiation of the module 200 exceeds a pre-selected limit. The central computer can further compute how much grout must be poured into a particular loaded module in order to properly encapsulate the wastes, and has the capacity to actuate an alarm circuit when the ultrasonic detectors 41 indicate that an unacceptable percentage of the wastes contained in the liner are in liquid form.

In the preferred embodiment, the height of the processing platform 18 is chosen to correspond approximately with the height of the bed of a trailer truck 13 so that any human operators who may be present on the platform 18 when the lid is removed from the cask 15 will not be exposed to the radiation beaming out of the top of the cask. In operation, the shield bell 19 is lowered into the open cask 15, engages the liner contained therein, and then is swung over the sensors 39 and 41 of the characterization station 37 and quickly lowered to within a few inches of these sensors to minimize any of the exposure of section 3 to any radiation beaming out from the bottom of the shield bell 19 which reflects off of the platform 18. In the preferred embodiment, the processing platform 18 is formed from a solid slab of concrete both for the structural solidarity of the facility 1 as a whole, as well as for shielding purposes. This last purpose will become clearer after the structure and function of the lag storage wells 50 is explained hereinafter. While the characterization station 37 of the preferred embodiment includes only radiation detectors 39 and ultrasonic detectors 41 and other types of detectors (such as remote T.V. monitors for visually identifying the waste) may also be included if desired.

Finally, the remote-handled waste section 3 of the facility 1 includes four lag storage wells 50, as well as a remedial action room 53 formed from shielded walls 54 and accessible through shielded doors 55. Each of the lag storage wells 50 includes a generally cylindrical well topped by a disk-shaped cover. The lag storage wells 50 provide a safe and convenient storage area for nuclear waste shipments in which the characterization station 37 has detected the presence of liquids in excessive quantities or other unacceptable conditions. Additionally, the lag storage wells may be used to temporarily store shipments of remote-handled wastes when the grouting station 118 becomes backed up. The materials and thickness of the disk-shaped cap which tops the wells 50 are chosen so as to reduce the amount of radiation beamed into the working area of section 3 from the remote handled wastes storable therein to within a safe level. The remedial action room provides a separately contained area within the remote handled section 3 of the facility 1 where broken liners (or liners containing liquids) may be properly repaired or treated without any danger of contaminating the main portion of the remote handled section 3, or the facility 1 at large. As will become more evident hereinafter, the provision of a separately contained room 53 to repair the broken walls of a liner is important because the walls of the liner provide one of the three radiation and water barriers within a module 200 when the liner is grouted within one of these modules. When free liquids are found within the waste liners, the remedial action room 53 provides a contained area where the liquid may be mixed with suitable absorbants or other solidification media so as to bring it into a solid form acceptable for burial within the purview of present federal regulations. Under normal circumstances, neither the lag storage wells 50 nor the remedial action room 53 is used to process the remote handled wastes. Instead, after the characterization tests are completed, these wastes are usually remotely hoisted through the labyrinth exit 56 formed by shield walls **57*a*, 57*b* which form the back of section 3 and placed into a module 200 on a rail cart 64 en route to the grouting station 118**.

The module loading and transportation section 60 is centrally located within the facility 1 between the remote handled section 3 and the contact handled section 85. The central location of the module loading and transportation section 60 allows it to conveniently serve both the contact and remote handled sections 3 and 85 of the facility 1. Generally, the module loading and transportation section 60 includes a conventional traveling crane 62 (which includes all the parts and capacities of previously described traveling crane 23) for loading modules 200 which are stacked outside the building 1 onto rail carts 64. These rail carts 64 are freely movable along a pair of parallel loading rail assemblies **66*a* and 66*b*. In order to render the rail carts 64 free-moving, the beds 70*a* and 70*b* onto which the tracks 68*a* and 68*b* are mounted are slightly inclined so that the carts 64 engaged onto the tracks 68*a* and 68*b* of the loading rail assemblies 66*a* and 66*b* will freely roll down these tracks by the force of gravity. While not shown in any of the several figures, each of the loading rail assemblies 66a and 66b includes a plurality of pneumatically-actuated stopping mechanisms for stopping the rail carts 64 at various loading, grouting and capping positions along the loading rail assemblies 66a and 66b. The module loading and transportation section 60 includes a return rail assembly 74 having a bed 78 which is inclined in the opposite direction from the beds 70a and 70b of the loading rail assemblies 66a and 66b. The opposite inclination of the bed 78 of the return rail assembly 74 allows the rail carts to freely roll on the tracks 76 by the force of gravity back to a loading position in section 60 after a grouted and capped module 200 has been removed therefrom. Finally, a shield wall 79 (which is preferably formed from a solid concrete wall at least 12 inches thick) is placed between the rail assembly 66a and the return rail assembly 74 in order to shield the contact section 85 from any exposure from the remote-handled wastes contained within the shield bell 19 as they are loaded into one of the modules 200 and grouted. This shield wall 79 generally serves the dual function of allowing a contact-handled waste section 85 to be enclosed within the same facility as the remote handled waste section 3, and allowing the use of a common module loading and transportation section 60 for both the remote and the contact handled sections 3 and 85 of the facility 1**. This last advantage avoids the provision of duplicate loading and transportation systems.

Turning now to the contact-handled waste section 85, this section of the facility 1 includes many of the same general components present in the remote handled section 3. For example, section 85 includes a drive-through 87 including the same sort of driveway 89, entrance 90 and exit (not shown) previously discussed with respect to drive-through 7. Section 85 also includes a processing platform 93 preferably formed from a solid slab of concrete which rises to approximately the same height as the bed of a truck so as to facilitate the unloading of the packaged wastes from the delivery truck 95. Section 85 also includes a pair of characterization stations 107a and 107b, and may also include lag storage wells. Finally, section 85 includes a remedial action room 112 for repairing broken containers, and converting liquid and other improperly packaged wastes into an acceptable solid form for burial.

However, despite these common components with section 3, section 85 includes some other components which are unique in the building 1. For example, a relatively light-duty jib crane 99 having a magnetic or vacuum hoist 101 is used in lieu of the relatively heavy traveling crane 23 of section 3. Because the wastes which are processed in section 85 are of a sufficiently low radiation level so that they may be directly contacted by human workers, there is no need for a crane capable of lifting the heavy shield bell 19 used in section 3. Consequently, the crane used in section 85 need only be capable of lifting lightly-packaged nuclear wastes, which typically arrive at the building 1 in 55-gallon steel drums 97. Although some light shadow shields may be used on the contactable section 85 of the building 1, the generally low radiation level of the wastes processed in this area obviates the need for heavily shielding each of steel drums 97 containing the wastes. Therefore, a conveyor system 103 preferably formed from rollers is provided which greatly facilitates the handling of the drums 97 in which the wastes are contained. Finally, a high-force compactor 110 is provided which not only compacts the wastes into a smaller volume, but squeezes the surrounding drum down to a point so far above the inelastic limit of the steel that the wastes are incapable of "springing back" in volume during the grouting process. This is an important advantage which will be elaborated on at a later point in this text.

The conveyor system 103 includes both a pair of serially arranged compactor conveyor belts 105a and 105b, as well as a remedial action conveyor belt 106. Compactor conveyor belt 105a conveys the 55-gallon drums 97 containing the contact-handled waste from the jib crane 99 through a first characterization station 107a which includes ultrasonic and radiation detectors (not shown), and into the loading mechanism 110.1 of the high-force compactor 110. The high-force compactor 110 applies a pressure of between 500 and 1,100 tons to the 55-gallon drum containers, thereby reducing them into high-density "pucks" 117 having a density of between 60–70 lbs./cu. ft. In the preferred embodiment, a compaction force of 600 tons is typically used. The high-density pucks 117 are ejected from the high-force compactor 110, and slide down a ramp 111.2 onto compactor conveyor belt 105b, which in turn facilitates the movement of pucks 117 through a second characterization station 107b which is likewise equipped with ultrasonic and radiation detectors (not shown). The conveyor belt 105b then conveys the high-density puck 117 to the magnetic or vaccum hoist 116 of a jib crane 114, which swings the puck 117 over into a module 200 en route to the grouting station 118. The remedial action conveyor belt 106 comes into play when the characterization station 107a defects that (a) the drum 97 contains a liquid, (b) the walls of the drum 97 are broken, or (c) the waste contained within the drum 97 is not compressible. If any of these three conditions are detected, a human operator (not shown) merely pushes the drum 97 from the compactor conveyor 105a onto the remedial action conveyor belt 106, which in turn conveys the drum 97 to the remedial action room 112 where appropriate wall-repairing, liquid solidification, or separate in-drum grouting procedures are undertaken in order to put the drum 97 and its contents in proper condition for encapsulation within a module 200. In the event there is a back-up condition in the remedial action room 112, the drum 97 may be temporarily stored in the lag storage wells 113 of the contact handled section 85.

Figure 2:
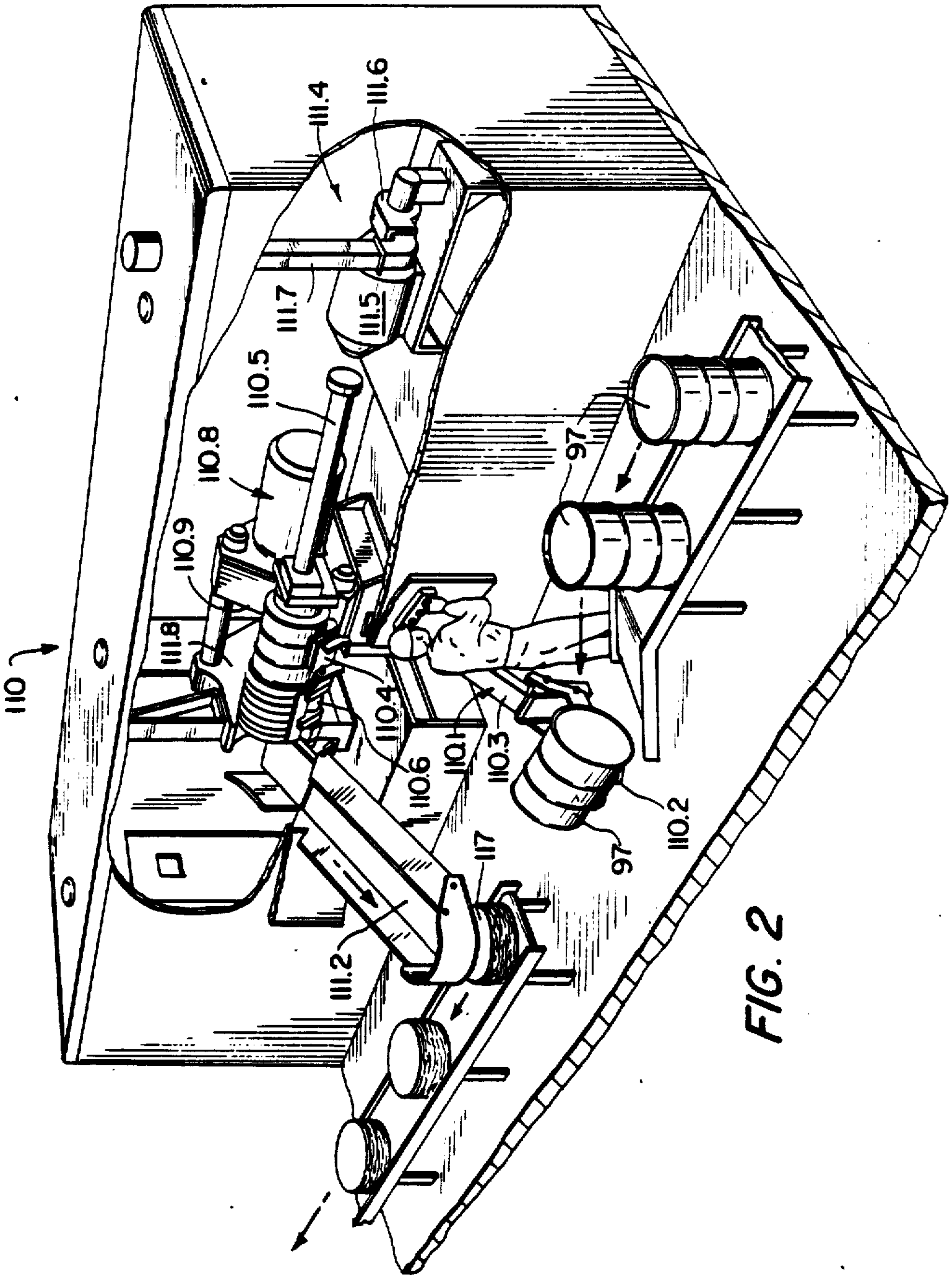
FIG. 2 is a perspective, cutaway view of the high-force compactor used in the packaging facility illustrated in FIG. 1.

With specific reference now to FIG. 2, the high-force compactor 110 of the invention includes a loading mechanism 110.1 having a drum scoop 110.2 at the end of an articulated, retractable arm assembly 110.3 as shown. Drums 97 sliding down the chute at the end of the compactor conveyor 105a are fed into the drum scoop 110.2 by a human operator. The articulated, retractable arm assembly 110.3 then loads the drum 97 into a loading cradle 110.4. The compactor 110 further includes a loading ram 110.5 which feeds the drum 97 into a retractable compaction cylinder 110.6 which is movable between a position outside the main ram 110.8, and the top of the ejection ramp 111.2. In FIG. 2, the compaction cylinder 110.6 is illustrated in its extended position away from the main ram 110.8, and adjacent the top of the ejection ramp 111.2. After the drum 97 is loaded into the compaction cylinder 110.6, the cylinder 110.6 is retracted into the main ram 110.8, where the drum 97 is crushed between the ram piston 110.9 (not shown), and the bed of the main ram 111.8. As previously mentioned, a compaction force of between 500 and 1,100 tons is applied to the drum 97. There are three distinct advantages associated with the use of such a high compaction force. First, the consequent reduction in volume of the drum 97 and its contents allows many more drums to be packed inside one of the modules 200. Specifically, the use of such a high compaction force allows thirty-five to eightly-four drums 97 to be packaged inside one of the modules 200, instead of fourteen. Secondly, and less apparent, the use of such a high compaction force deforms the steel in the drums 97 as well as the waste contained therein well beyond the inelastic limits of the materials, so that there is no possibility that the resulting, high-density pucks will attempt to "spring back" to a larger shape after they are ejected from the ejection ramp 111.2. The elimination of such "spring back" eliminates the possibility of cavities or internal cracks forming within the hardening grout in the module 200 after the module 200 is loaded with pucks 117 and grouted. Far from "springing back", the resulting high-density pucks 117, when covered with grout, form a positive, non-compressible reinforcing structure in the interior of the module 200 which assists the module in performing its alternative function as a structural support member for the earthen trench cap 164 which is applied over the disposal site 150. Finally, such extreme compaction of the waste inside the drums 97 (which is typically rags, paper and contaminated uniforms) renders them resistant to the absoprtion of water. This, of course, makes them less prone to leaching out radioactive material in the remote event that they do become wet. Such resistance to water absoprtion also renders the wastes less prone to bio-degradation which again complements the overall function of the module 200 in encapsulating the wastes, since such bio-degradation can over time "hollow out" the vessel carrying the waste, and result in subsidence problems.

In closing, it should be noted the compactor 110 includes an air filtration system 111.4 having a filter 111.5, a blower assembly 111.6, and an exhaust stack 111.7. The air filtration system 111.4 draws out any radioactive, airborne particles produced as a result of the application of the 660–1,100 ton force onto the drum 97 carrying the contactable waste.

Turning back to FIG. 1, the facility 1 includes a grouting station 118 having an extendable trough 120 capable of pouring grout into a module 200 on rail carts 64 engaged to either rail assembly **66*a* (adjacent the remote-handled waste section 3) or rail assembly 66*b* (adjacent the contact-handled waste section 85). The use of a single grouting station 118 for modules 200 loaded from both the non-contact and contact handled sections 3 and 85 again avoids the duplication of expensive components in the overall system. Just beyond the grouting station 118 is a capping station 122 including a traveling crane 126 having a hoist 128 for lifting the lids 220 over the tops of the modules 200 incident to the capping process. A more precise description of the capping process wil be given when the structure of the modules 200** is related in detail.

While the modules 200 are normally filled with waste, grouted at the grouting station 118 and capped at the waste packaging facility 1 located near the waste disposal site 150, they may also be processed at the facilities of the generator of the waste. Since the surface radiation of the resulting modules is generally low enough for contact handling, the wastes in the modules 200 may be conveniently stored onsite pending the availability of disposal space. When disposal space is available, the modules 200 may be transported in reusable transporation overpacks (not shown) to the disposal site 150 and stacked directly into the trenches 152. While this method is not preferred, it is usually less expensive than using the onsite waste storage facilities.

Figure 3:
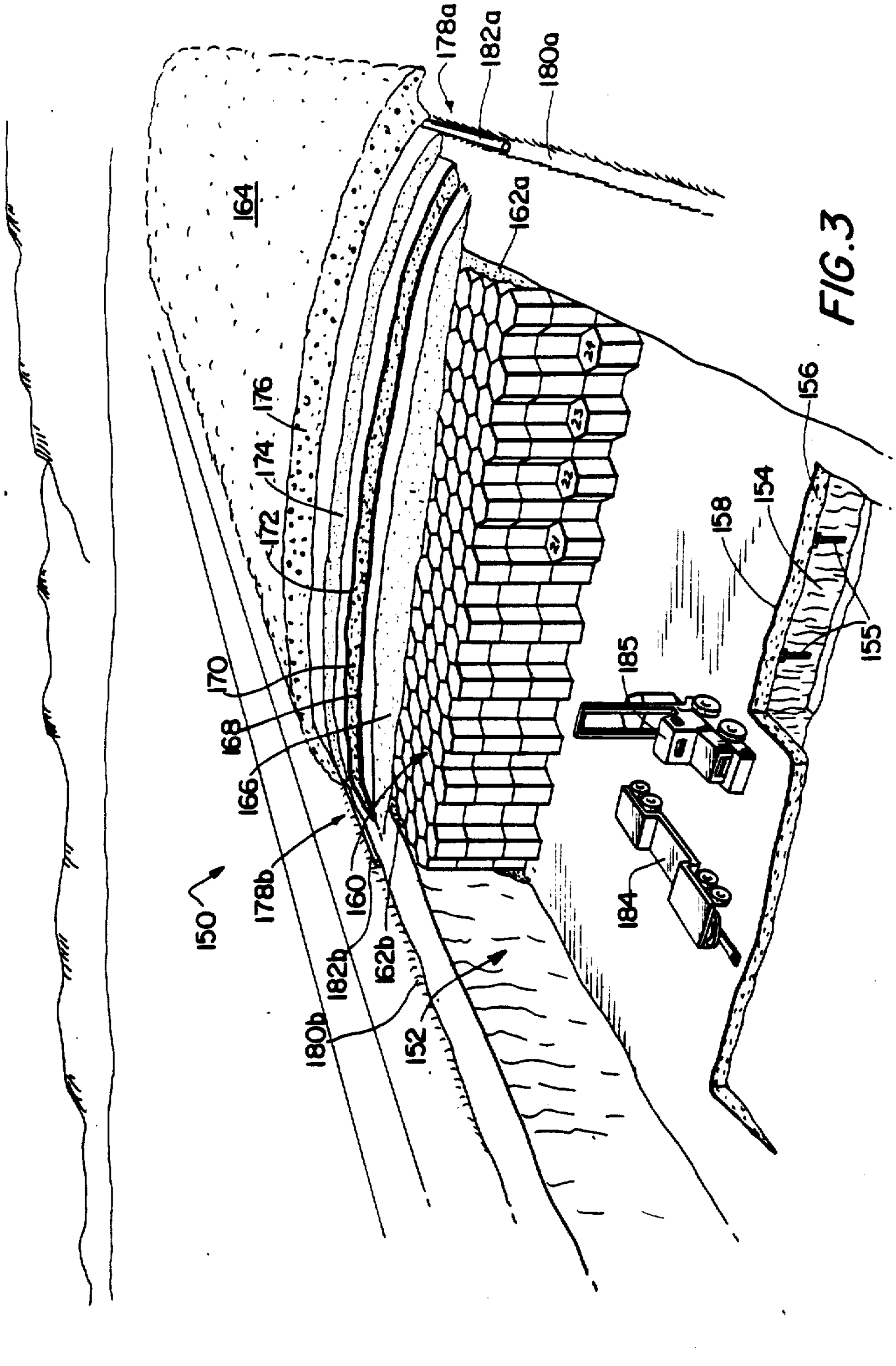
FIG. 3 is a perspective, cutaway view of the disposal site of the invention.

FIG. 3 illustrates the disposal site 150 used in conjunction with the packaging facility 1. The disposal site 150 generally comprises a trench 152 (or a plurality of parallel trenches) having a generally flat, alluvial floor 154. Before the trench is loaded with capped modules 200 in which the grout has hardened, a plurality of water-collecting lysimeters 155 are uniformly placed throughout the floor 154 in order to monitor the radiation level of water in the trench. The lysimeters 155 are placed in the trench floor 154 by augering a hole in the floor, and inserting the elongated bodies of the lysimeters 155 therein. A network of plastic tubes (not shown) enables the operators of the disposal site 150 to periodically draw out any water that has collected in the cups of the lysimeters 155. The radiation level of these water samples is periodically monitored to determine whether or not any radioactive substances have somehow been leached from the modules 200. After the lysimeters 155 have been properly buried throughout the floor 154, the floor 154 is covered with a gravel layer 156 about two feet thick, which acts as a capillary barrier. Even though the disposal site 150 is preferably selected in an area where all flow of ground water would be at least 80 feet below the trench floor 154, the gravel capillary barrier 156 is placed over the top of the floor 154 to provide added insurance against the seepage of ground water into the stacked array 160 of modules 200 by capillary action from the trench floor 154. While all of the capillary barriers in the disposal site 150 of the invention are preferably formed of gravel, it should be noted that the invention encompasses the use of any coarse, granular substance having a high hydraulic conductivity. The layer of gravel 156 is covered with a choked zone of sand 158 approximately four inches thick. This choked zone of sand 158 acts as a road bed for the wheels of the heavy forklifts 185 and trailers 184 which are used to transport the modules 200 to the trench 152. If the zone 158 were not present, the wheels of these vehicles 184, 185 would tend to sink into the gravel layer 156.

The next component of the disposal site 150 is the solidly packed array 160 of hexagonal modules 200 illustrated in FIG. 3. In the preferred embodiment, the modules 200 are preferably stacked in mutually abutting columns, with each of the hexagonal faces of each of the modules 200 coplanar with the hexagonal faces of the other two modules forming the column. The arrangement of the modules 200 into such mutually abutting columns results in at least four distinct advantages. First, such solid packing of the modules 200 provides a support structure for the non-rigid trench cap 164 which may be quickly and conveniently formed from natural, fluent substances such as soil, sand and gravel. Second, such an arrangement is almost completely devoid of any gaps between the modules 200 which could result in the previously discussed soil subsidence problems. Third, such an arrangement could weather even severe seismic disturbances, since each of the modules 200 is capable of individual, differential movement along eight different planes (i.e., the top, bottom and six side surfaces of the hexagonal prisms which form the modules 200). Because none of the modules are rigidly interlocked with any of the adjacent modules, each of them is capable of at least some vertical and horizontal sliding movement in the event of a seismic disturbance. Such an eight-plane freedom of movement renders the entire module array 160 flexibly conformable with changes in the shape of the trench 152, and eliminates or at least minimizes the probability of a local seismic disturbance creating local stress points in the array 160 that are powerful enough to rupture or crack the walls of individual containers. Fourthly, the columnar stacking used in the array 160 makes it easy to recover a particular module 200 in the event that such recovery becomes desirable, since any one of the modules 200 may be withdrawn from the trench by digging a single, module-wide hole over the particular column that the desired module is included within. In the preferred embodiment, the most radioactive or "hottest" of the modules 200 is placed on the bottom layer of the module array 160 and surrounded by less radioactive modules so that the surrounding modules, and the middle and top module layers will provide additional shielding from the radiation emanating from the materials in the "hot" modules.

The trench 152 further includes side gravel capillary barriers 162*a* and 162*b* which are positioned between the sides of the solid module array 160, and the walls of the trench 152. Again, the purpose of these barriers 162*a* and 162*b* is to prevent any seepage of water from being conducted from the sides of the trench 152 to the sides of the solidly packed array 160 of modules 200. In the preferred embodiment, each of these side capillary barriers 162*a* and 162*b* is about two feet thick.

The trench cap 164 is preferably a non-rigid cap formed from fluent, natural substances such as soil, sand and gravel. Such a cap 164 is more resistant to seismic disturbances than a rigid, synthetic structure would be. Specifically, the non-rigidity of the cap 164 makes it at least partially "self-healing" should any seismic disturbance act to vertically shift the various layers of the cap 164 small distances from one another. Additionally, in the event of a severe seismic disturbance which does succeed in causing considerable damage to the cap 164, the cap 164 may be easily repaired with conventional road building and earth moving equipment. As was previously indicated, the solidly packed array of modules 160 provides all of the structural support needed to construct and maintain the various layers of the trench cap 164.

The first layer of the trench cap 164 is preferably a layer of alluvium 166, which should range from between four feet thick on the sides to seven feet thick in the center. As is indicated in FIG. 3, the alluvium layer 166 (which is preferably formed from the indigenous soil which was removed in creating the trench 152) gradually slips away from the center line of the layer at a grade of approximately 4.5%. Such a contour allows the cap 164 to effectively shed the water which penetrates the outer layers of the cap 164, and to direct this water into side drains 178*a* and 178*b*. After the alluvium layer 166 is applied over the top of the solidly packed module array 160, the layer 166 is compacted before the remaining layers are placed over it. Such compaction may be effected either through conventional road bed compacting equipment, or by merely allowing the alluvium in the layer 166 to completely settle by natural forces. Of the two ways in which the alluvium in the layer 166 may be compacted, the use of road bed compaction equipment is preferred. Even though the natural settling time of the alluvium in the invention is very fast as compared to the settling times of soils used in prior art disposal sites, it is still rarely shorter than three months, and may be as long as one year, depending upon the characteristics of the particular soil forming the alluvium. By contrast, if road compaction equipment is used, the settling time may be reduced to a matter of a few days. It should be noted that the alluvium layer 166 is placed over the solidly packed array 160 at approximately the same rate that the array 160 is formed by stacking the individual modules 200. Such contemporaneous placement of the alluvium layer 166 over the module array 160 minimizes the amount of radiation which the trench workers are exposed to as the disposal site 150 is formed.

After the alluvium layer 166 has been appropriately compacted, a choked zone of sand 168 of approximately four inches in thickness is applied over it. After the sand layer 168 has been completely applied over the aluvium layer 166, another gravel capillary barrier 170, approximately two feet in depth, is placed over the choked sand layer 168. The choked sand layer 168 serves as an intrusion barrier between the relatively coarse gravel forming the gravel capillary barrier 170, and the relatively finer alluvium in the alluvium layer 166. Once the gravel capillary barrier 170 has been laid, another choked zone of sand 172, approximately four inches in thickness, is applied over the gravel capillary barrier 170. Next, a layer of fine, water shedding silt 164 is applied over the choked zone of sand 172 overlying the gravel capillary barrier 170. Again, the choked zone of sand 172 serves as an intrusion barrier between the slit in the silt layer 174, and the gravel in the gravel capillary barrier 170. The silt layer 174 is the principal water-shedding layer of the trench cap 164, and is approximately two feet thick, and formed from sized material (preferably obtained locally) which is compacted in place. The use of silt layer 174 in lieu of other water-shedding natural materials, such as clay, is advantageous in at least two respects. First, silt is often more easily obtainable locally than clay, and hence is less expensive. Secondly, if the silt layer 174 should become saturated with water, it will not tend to split or crack when it dries out as clay would. The absence of such splits or cracks helps maintain the overall integrity of the trench cap 164.

The side edges of the silt layer 174 terminate adjacent to the pair of french drains 178*a* and 178*b* located on either side of the trench 152. The french drains 178*a* and 178*b* include a trench in which perforated pipes 182*a* and 182*b* are laid. Water flowing down the sides of the silt layer 174 will float through the perforations in the pipes 182*a* and 182*b* and flow along the drain trenches 180*a* and 180*b*, away from the trench 152. In the event that the rains or other source of surface water becomes so severe that the silt layer 174 becomes completely saturated with water, the gravel capillary barrier 170 will prevent any water from migrating down from the saturated silt layer 174 into the module array 160 via capillary action.

The top and final layer 176 of the trench cap 164 consists of graded rip-rap which, in more colloquial terms, is very coarse gravel (which may be as large as boulder sized). The rip-rap layer 176 performs at least three functions. First, it insulates the silt layer 174 from potentially erosive winds and running water. Second, it provides a final radiation barrier against the module array 160 which brings the radiation level of the disposal site 150 down to well within the range of normal background radiation. Third, it provides an intrusion barrier which discourages would-be human and animal intruders from digging up the ground above the module array 160. The preferred embodiment of the cap 164 as heretofore described is for arid regions. In humid regions, an alternative embodiment of the cap 164 would comprise a first water infiltration barrier of native soil over the solid array 160 of modules 200. This layer in turn would be covered by a sand and gravel capillary barrier similar to the previously discussed layers 168, 170 and 172. These sand and gravel capillary barriers would in turn be covered by a bio-intrusion layer of cobble, and topped by additional sand and gravel layers for supporting a final layer of soil having a vegetative cover. In such an alternative embodiment, the vegetative cover serves both to prevent any erosion which might occur on the upper layer of soil, and also removes water which infiltrates the top layer of the cap. The vegetation used should have shallow roots in order that the integrity of the cap 164 will not be violated. Additionally, such an alternative embodiment might have a steeper slope of perhaps 10° or more because of the greater amount of rainfall associated with such regions.

With reference now to FIGS. 4A, 4B, 4C and 5A, 5B, the module 200 of the invention generally consists of a container 201 having reinforced concrete walls and a lid 220 which caps the container 201 after it is filled with nuclear wastes and properly grouted.

Figure 4A:
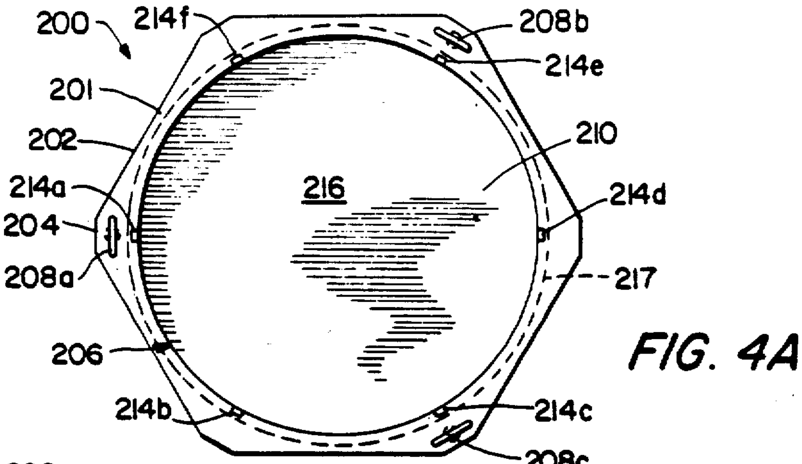
FIG. 4A is a top, plan view of the packaging module of the invention.
Figure 4B:
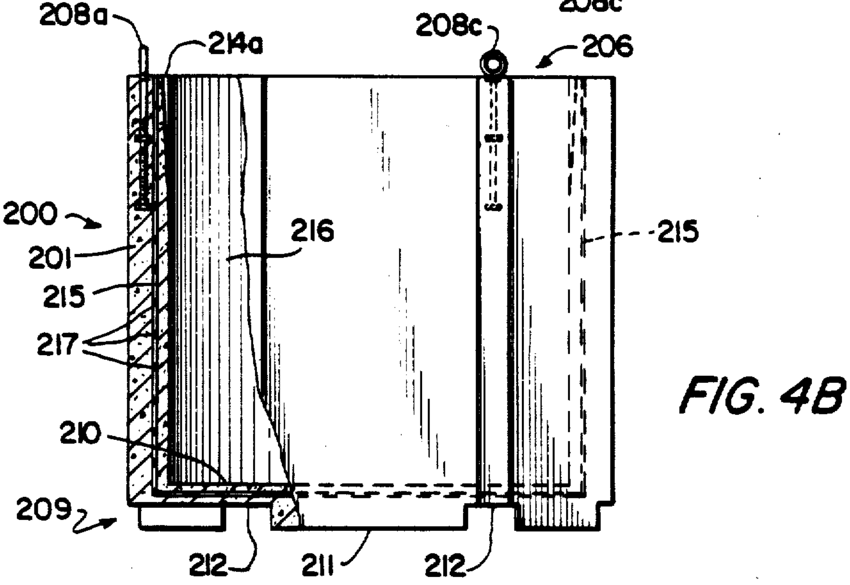
FIG. 4B is a side, partial cross-sectional view of this module.
Figure 4C:
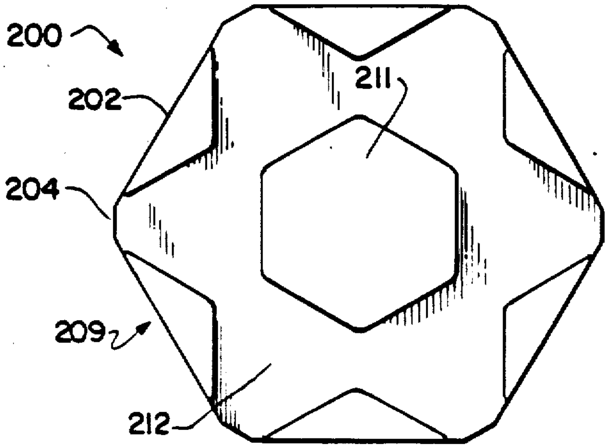
FIG. 4C is a bottom view of the module of the invention.

With specific reference now to FIGS. 4A through 4C, the container 201 of the module 200 is a hexagonally-shaped prism 202 having a cylindrical interior 216. The corners 204 where the hexagonal walls abut one another are preferably truncated so that small gaps will be left between abutting modules 200 when they are stacked in the module array 160 illustrated in FIG. 3. These small spaces are large enough to receive recovery tools (should the recovery of any one of the modules 200 become desirable) but are small enough so that no significant amount of soil subsidence will occur when the modules 200 are arranged in the configuration illustrated in FIG. 3. Further, the truncated shape of the corners 204 renders these corners less vulnerable to the chipping or cracking which could otherwise occur when the forklift 185 pushes the module 200 into the module array 160 incident to the stacking process.

Turning now to the top and bottom portions of the containers 201 of the modules 200, the top portion 206 is opened as shown to permit the loading of nuclear waste and grout. The top portion 206 includes three I-bolt anchors 208*a*, 208*b* and 208*c* which allow the container 201 to be handled by the grappling hooks of the cranes in the packaging facility 1 and stacked into the trench 164. Alternatively, these anchors 208*a*, 208*b* and 208*c* allow the modules 200 to be lifted out of the trench 164 if recovery is desired. The shanks of the anchors 208*a*, 208*b* and 208*c* are deeply sunken into the concrete walls of the container 201 as indicated in order to insure an adequate grip thereto. The bottom portion 209 of the container 201 includes the bottom surface 210 of the interior of the container 201, and an outer surface 211 having a pattern of grooves 212. Each of these grooves are slightly deeper and wider than the forks of the shielded forklift 185, so that these grooves 212 greatly facilitate the handling of the module 200 by the forklift 185. The angular pattern of the grooves 212 also allows such a forklift to engage a particular module from a variety of different angles, which further facilitates the handling of the modules. Reinforcing the concrete walls and bottom portion of the container 201 of the module is a "basket" 215 formed from commercially available, steel-reinforcing mesh. The basket 215 greatly increases the tensile strength of the walls and bottom portion 209 of the container 201 of the module 200. In the preferred embodiment, the walls fo the container 201 are at least three inches thick. Additionally, the cylindrical interior 216 of the container 201 is at least seventy-five inches in diameter in order that fourteen drums or seven stacks of high-density pucks 117 may be stacked within the cylindrical interior 216 of the container 201. The top portion 206 of the container 201 includes a plurality of grooves 214*a*, 214*b*, 214*c*, 214*d*, 214*e* and 214*f* for receiving the cap-securing rods 232*a*, 232*b*, 232*c*, 232*d*, 232*e* and 232*f* of the slab-type container lid 220, which will be presently discussed in detail.

Figure 5A:
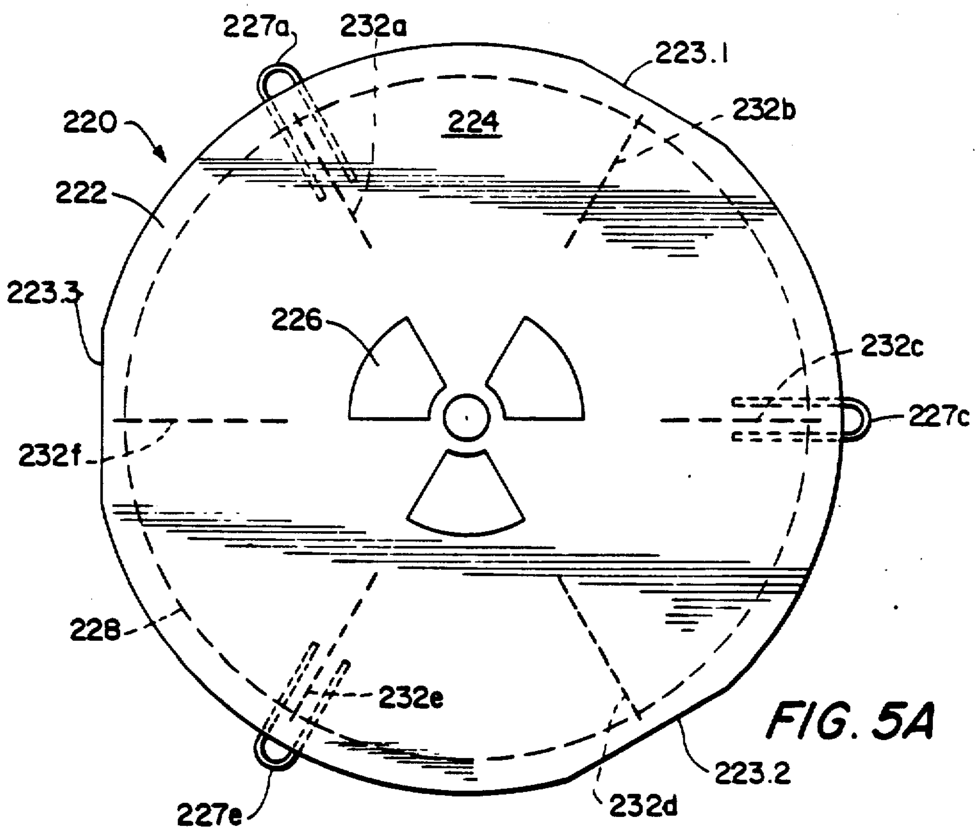
FIG. 5A is a top view of the cap of the module of the invention.
Figure 5B:
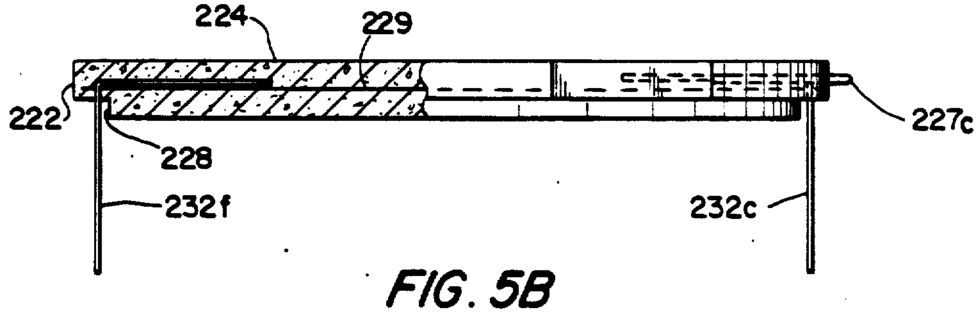
FIG. 5B is a side, partial cross-sectional view of the cap illustrated in FIG. 5A.

With reference now to FIGS. 5A and 5B, the slab-type container lid 220 generally includes a disk-shaped upper section 222, and an integrally formed, disk-shaped lower section 228 which has a slightly smaller diameter. The edge of the upper section 222 is flattened in three sections 223.1, 223.2 and 223.3, which are spaced approximately 120° from one another. When the container lid 220 is properly placed over the open top portion 206 of the container 201, these flattened sections 223.1, 223.2 and 223.3 should be angularly positioned so that they are directly opposite the previously discussed I-bolt anchors 208*a*, 208*b* and 208*c*, in order to provide clearance for crane hooks to engage the I-bolt sections of the anchors. The top surface 224 of the upper section 222 of the lid 220 includes a radiation warning symbol 226, which is preferably molded into the face of the lid 220. An identifying serial number may also be molded into the top surface 224 of the lid 220 (as indicated in FIG. 3) in order that the module 220 may be easily identified if recovery of the module ever becomes necessary or desirable.

As may best be seen with reference to FIG. 5A, three U-shaped transporting lugs 227*a*, 227*c* and 227*e* are placed around the circumference of the upper section 222 of the container lid 220 approximately 120° from one another. These lugs 227*a*, 227*c* and 227*e* are preferably offset from the flattened sections 223.1, 223.2 and 223.3 along the circumference of the upper section 222. Such an angular offset between these lid-transporting lugs 227*a*, 227*c* and 227*e* and the aforementioned flat sections 223.1, 223.2 and 223.3 minimizes the possibility that a crane hook intended for engagement with one of the I-bolt anchors of the module container 201 will inadvertently catch one of the lid transporting lugs 227*a*, 227*c* or 227*e* and accidentally tear it off. As previously mentioned, the container lid 220 further includes an integrally formed lower section 228 which has a slightly smaller diameter than the disk-shaped upper section 222. A layer steel-reinforcing mesh 229 is molded into the concrete forming the container lid 220 in the position shown in FIG. 5B. Also molded into the lid 220 are six equidistantly spaced cap-securing rods 232*a*, 232*b*, 232*c*, 232*d*, 232*e* and 232*f*. These rods are slid into the complementary slots 214*a*, 214*b*, 214*c*, 214*d*, 214*e* and 214*f* after the container has been filled with nuclear waste and grouted. Both the container lid 220 and the module container are preferably molded from non-porous portlant-based concrete having a compressive tolerance on the order of 4000 psi. Such concrete is both strong and resistant to penetration by water.

Figure 6:
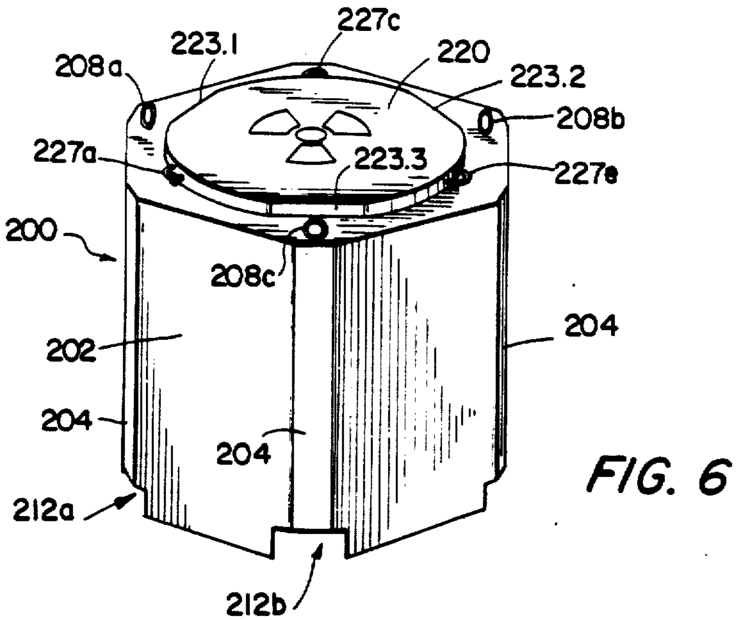
FIG. 6 is a perspective view of a packed and sealed module of the invention.
Figure 7:
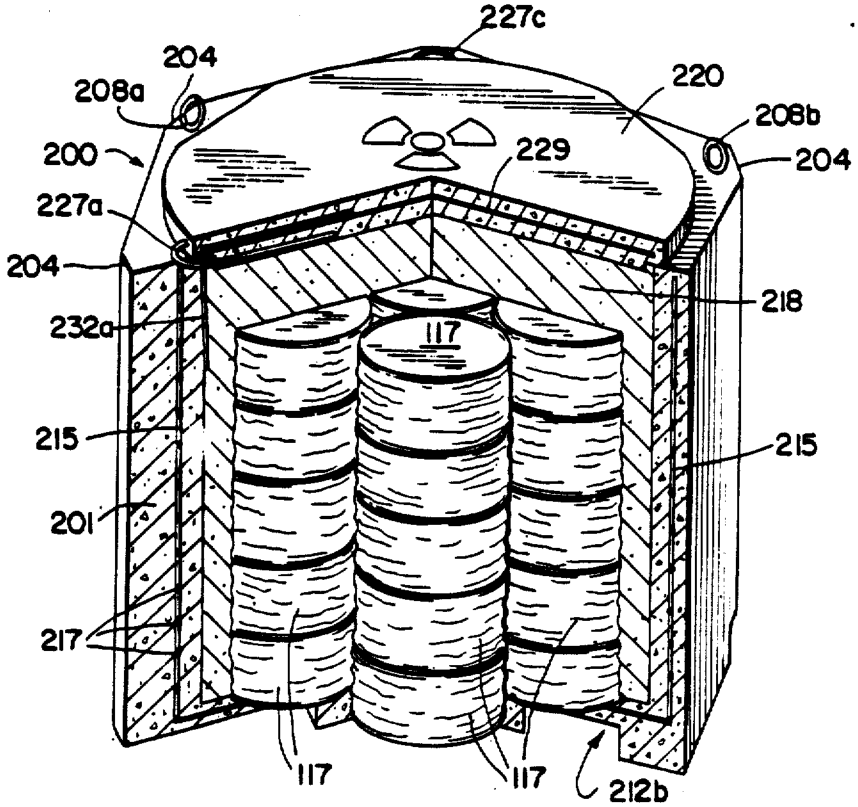
FIG. 7 is a perspective, cutaway view of a packed module of the invention.

FIGS. 6 and 7 illustrate a module 200 which has been filled with high-density pucks 117 formed from the high-force compactor 110, and subsequently grouted and capped. In operation, seven stacks of high-density pucks 117 are centrally positioned within the container 201 of the module 200 as shown in FIG. 7. The compacted containers which cover the compacted waste form an additional radiation and water barrier between the waste and the exterior of the module 200. Next, the extendable trough 120 of the grouting station 118 of the building 1 pours grout 218 over the seven stacks of pucks 117 so as to form a solid layer of grout between the pucks 117 and the inner surface of the walls of the container 201. In the preferred embodiment, the grout used to fill the module 200 is a 3,000 or 4,000 psi portland-based concrete. However, gypsum, pozzolan, flyash or other cementitious materials may also be used for grout. The hardened grout 218 forms a third radiation and water barrier between the waste in the pucks 117 and the outer surface of the container 200, as is evident from the drawing. The grout 218 also serves to anchor the cap-securing rods 232*a*, 232*b*, 232*c*, 232*d*, 232*e* and 232*f* into the body of the module 200, so that the container 201, the lid 220, the grout 218, and the stacks of pucks 117 become a single, solid structure having a considerable compressive and tensile strength. The completed, hardened modules 200 are carried from the packaging building 1 by drop-bed trailers 184, and stacked into the solid array 160 illustrated in FIG. 3 by means of shielded forklifts 185.

Although not shown in any of the several figures, the module 200 may be specially modified to package special, high intensity nuclear wastes such as spent control rods. Specifically, the module 200 may be formed with very thick concrete walls so that a relatively small cylindrical hollow space is left in the center of the module. The control rods may then be transferred directly from a shield transportation cask 15 into the small cylindrical hollow space in the pre-grouted module. Such a modified module may be made longer to accommodate several complete control rods. In the alternative, pregrouted modules 200 of normal height may be used if the rods are cut up into smaller lengths.

What is claimed is:

1. A nuclear waste packaging facility comprising:

(a) a first section substantially surrounded by radiation shielding, including means for remotely handling waste delivered to said first section and for placing the waste into a disposal module;

(b) a second section substantially surrounded by radiation shielding, including means for handling a deformable container bearing waste that is delivered to said second section, said handling means including a compactor and means for placing the waste bearing deformable container into said compactor, said compactor capable of applying a compacting force to the waste bearing containers sufficient to inelastically deform the waste and container, and means for delivering the deformed waste bearing containers to a disposal module (c) a module transportation and loading section disposed between said first and second sections including a transport means and means for handling empty modules delivered to said facility and for loading the empty modules on said transport means, said transport means moving empty disposal modules to said first section and empty disposal modules to said second section for locating empty modules in a position for loading with nuclear waste, and (d) a grouting station comprising means for pouring grout into the waste bearing disposal module, and a capping station comprising means for placing a lid onto the waste bearing grout-filled disposal module to completely encapsulate the waste.

2. The nuclear waste packaging facility of claim 1, wherein said grouting station includes an extendable trough for pouring grout into modules bearing nuclear waste.

3. The nuclear waste packaging facility of claim 1, wherein said module loading and transportation section includes first and second parallel rail assemblies adjacent the first and second facility sections, respectively.

4. The nuclear waste packaging facility of claim 3, further comprising a shield wall between said parallel rail assemblies for shielding the second section of the facility from the radiation emanating from remote handled waste when the remote handled waste is loaded into a module.

5. The nuclear waste packaging facility of claim 3, wherein said module loading and transportation section further includes rail carts for moving empty modules to said first section and to said second section and locating empty modules in a position for loading with said nuclear waste, wherein the rail assemblies have inclined beds so that the rail carts roll into loading positions by the force of gravity.

6. The nuclear waste packaging facility of claim 1, wherein said first, remote handled waste section of the facility includes a characterization station having means for determining the liquid content and means for determining the radioactive level of the remote handled waste containers delivered to the first section.

7. The nuclear waste packaging facility of claim 6, wherein the outputs of the means for determining the radioactive level of the waste are connected to a computer which generates a signal indicative of how many waste containers may be loaded into a particular module before the surface radiation of the grouted module will exceed a certain, preselected value.

8. The nuclear waste packaging facility of claim 1, wherein said first, remote handled section of the facility includes a lag well for temporarily storing remote handled waste delivered to said first section before placement in a module.

9. The nuclear waste packaging facility of claim 1, wherein said first, remote handled section of the facility includes a separately shielded remedial section for repairing broken shipping containers delivered to said first section and solidifying radioactive liquids delivered to said first section before placement in a module.

10. The nuclear waste packaging facility of claim 1, wherein said second section of the facility includes a characterization station having means for determining the liquid content and means for determining the radioactive level of the contact handled waste containers delivered to the second section.

11. The nuclear waste packaging facility for claim 1, wherein said second section of the facility includes a lag well for temporarily storing contact handled waste delivered to said second section before placement in a module.

12. The nuclear waste packaging facility of claim 1, wherein said second section of the facility includes a separately shielded remedial section for repairing broken shipping containers delivered to said first section and solidifying radioactive liquids delivered to said first section before placement in a module.

13. A nuclear waste packaging facility comprising:

(a) a first section substantially surrounded by radiation shielding, including means for remotely handling waste delivered to said first section and for placing the waste into a disposal module, a characterization station having means for determining the radioactive level of the waste and means for determining the liquid content of waste delivered to said first section before placement in a module;

(b) a second section substantially surrounded by radiation shielding, including means for handling a deformable container bearing waste that is delivered to said second section, said handling means including a compactor and means for placing the waste bearing deformable container into said compactor, a characterization station having means for determining the radioactive level of the waste and means for determining the liquid content of waste delivered to said second section before placement in a module, said compactor capable of applying a compacting force to the waste bearing containers sufficient to inelastically deform the waste and container, and means for delivering the deformed waste bearing containers to a disposal module; and (c) a module transportation and loading section including a transport means and means for handling empty modules delivered to said facility and for loading the empty modules on said transport means, said transport means moving empty disposal modules to said first section and empty disposal modules to said second section and for locating empty modules in a position for loading with nuclear waste, and (d) a grouting station comprising means for pouring grout into the waste bearing disposal module, and a capping station comprising means for placing a lid onto the waste bearing grout-filled disposal module to completely encapsulate the waste.

14. The nuclear waste packaging facility of claim 13, further comprising a computer which is connected to the outputs of the means for determining the radioactive level of the waste of the characterization stations and which generates a signal indicative of the number of waste containers which can be loaded into a particular module container before the surface radiation of the completed module will exceed a certain, preselected level.

15. The nuclear waste packaging facility of claim 14, wherein the outputs of the means for determining the liquid content of the waste are connected to the input of the computer, and wherein the computer will actuate an alarm circuit when it receives a signal from either of the ultrasonic detectors which indicates that a radioactive waste is at least in part in a liquid state.

16. The nuclear waste packaging facility of claim 13, wherein said compactor is capable of applying a compacting force to the shipping containers of the contact waste of between 500 and 1,200 tons.

17. The nuclear waste packaging facility of claim 13, wherein said second section of the facility includes a compactor capable of applying a compacting force to the shipping containers of the contact waste of approximately 600 tons.

18. The nuclear waste packaging facility of claim 13, wherein said deformable container handling means includes a conveyor means for conveying the shipping containers of contact waste to the compactor.

* * * * *